United States Patent [19]

Andersson

[11] 4,108,066
[45] Aug. 22, 1978

[54] DEVICE FOR PRINTING BRAILLE

[76] Inventor: Lars-Eric Andersson, 91 A Nygatan, Skelleftea, Sweden, S-93100

[21] Appl. No.: 751,331

[22] Filed: Dec. 16, 1976

[30] Foreign Application Priority Data

Dec. 30, 1975 [SE] Sweden ............................ 7514768

[51] Int. Cl.² .......................... B44B 5/02; B41J 3/32
[52] U.S. Cl. .................................. 101/22; 101/28;
101/382 MV; 400/122
[58] Field of Search .................... 101/18, 22, 23, 28,
101/382 MV; 197/6.1

[56] References Cited

U.S. PATENT DOCUMENTS

| 900,622 | 10/1908 | Wait | 101/23 |
|---|---|---|---|
| 920,872 | 5/1909 | Huntdon et al. | 101/23 X |
| 956,140 | 4/1910 | McCann | 101/22 |
| 1,060,387 | 4/1913 | Wait | 101/23 |
| 1,726,803 | 9/1929 | Bramlette | 101/28 |
| 3,598,042 | 8/1971 | Boyd | 101/23 X |

FOREIGN PATENT DOCUMENTS

| 14,143 | 9/1934 | Australia | 101/28 |
|---|---|---|---|
| 1,142,671 | 9/1957 | France | 101/382 MV |
| 179,558 | 5/1922 | United Kingdom | 197/6.1 |

*Primary Examiner*—Paul T. Sewell
*Attorney, Agent, or Firm*—Haseltine, Lake & Waters

[57] ABSTRACT

A device for printing in the Braille system. The device includes a magnetic core with an outer layer on the core provided with holes arranged in a pattern for composing a text to be printed. Pins of magnetizable material are adapted to be inserted in the holes. The pins are of a greater length than the thickness of the layer. They are adapted upon contact with the magnetizable core to be attracted thereto to be retained in the holes. The core forms a roller and includes two end portions between which is a depression. An electrical winding is provided in this depression to magnetize the core. The outer layer is of a non-magnetizable material. The core includes a layer of magnetizable material inside of the outer layer to cover the holes therein.

2 Claims, 5 Drawing Figures

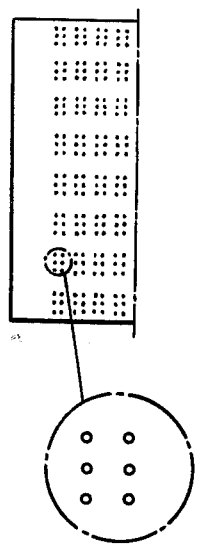
FIG.4
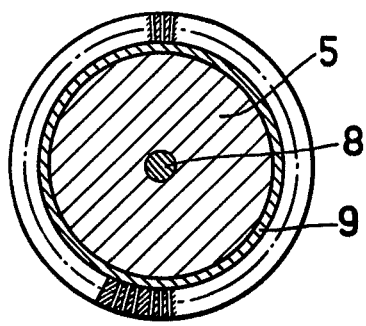
FIG.3
FIG.5
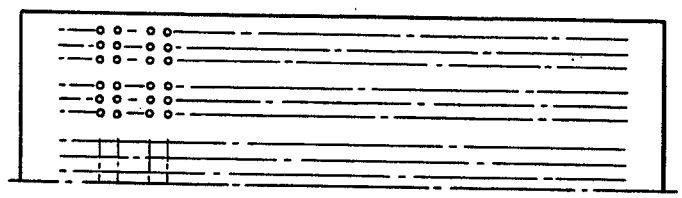

DEVICE FOR PRINTING BRAILLE

FIELD OF THE INVENTION

This invention relates to a device for printing in the Braille system.

The embossed printing, which today is used almost everywhere as printing for the blind usually is carried out according to the Braille alphabet, which is based on a 6-character system of six raised dots. The dots are read by the perception of touch, and their number and position in a square or a so-called Braille-cell, which at maximum can include six dots, determine — in certain cases in combination with signs — the meaning of the dots in their context. There exist various aids for writing Braille, which can be learned to use relatively easily, and by means of which relatively high writing speeds can be achieved. It has proved much more difficult, however, and involved high costs to print Braille in the way it heretofore has been carried out in known devices, by making castings of the Braille and preparing the necessary printing forms.

SUMMARY OF INVENTION

A device for printing and reproducing Braille which is of a simple design and renders it possible to print Braille in a great number of copies at reasonable costs, does not, to my knowledge, exist so far. It is, therefore, the object of this invention to provide a device for printing Braille which is so simple that it can be operated by persons with defective vision, which renders it possible to print and reproduce Braille at low costs. This object is achieved by a device according to the present invention has been given the characterizing features defined in the attached claims.

BRIEF DESCRIPTION OF DRAWING

The invention is described in greater detail in the following detailed description, with reference to the accompanying drawings, in which:

FIG. 3 is a cross-section through said printing roller along line III—III in FIG. 1, FIG. 4 is a view from above of the shell surface of the printing roller in unrolled state, and FIG. 5 shows on an enlarged scale the location of the holes in the shell surface of the printing roller relative to each other.

DETAILED DESCRIPTION

Figure 1:
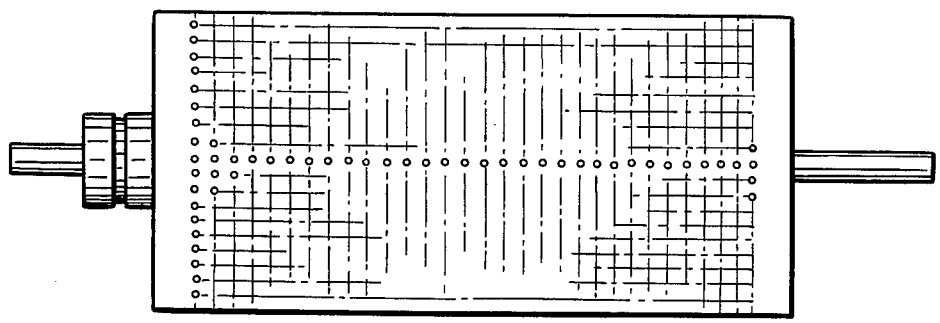
FIG. 1 shows the device according to the invention in the form of a printing roller.

In the drawings, the device according to the invention is shown by way of example, only in the form of a printing roller, which also acts as a printing form, for printing Braille. The roller is constructed about an electromagnet 1 having a magnetizable core 2 and a winding 3, which is disposed in a depression 4 between end portions 5 of the core having a diameter exceeding that of the depression 4. The winding 3 is electrically connected by wires 6 to slip rings 7, via which current is supplied for magnetizing the electromagnet and maintaining the same magnetized. The slip rings 7 are shown arranged on the axle 8 of the printing roller, but they also may be located on one of the end walls of said roller. The axle 8 of the printing roller is shown to extend through the whole length of the roller, but it also may consist of axle journals provided at the end portions of the roller.

Figure 2:
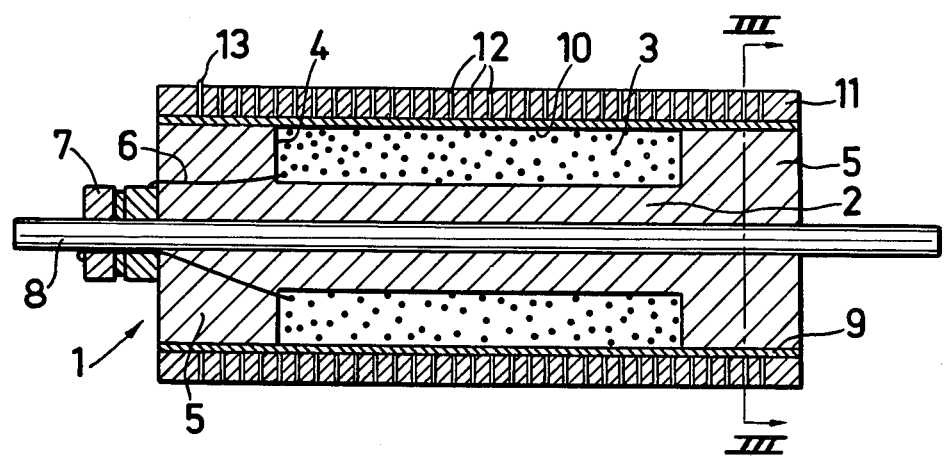
FIG. 2 is a longitudinal section through the printing roller shown in FIG. 1.

A layer 9 of magnetizable material, which is rigidly connected with the end portions 5 of the core, for example by press fit, shrink-on or by another connection known per se, inclusive of both weld and screw connection, encloses the core 2 and winding 3 and is provided between its end portions with a relatively narrow gap 10, which however can be omitted without jeopardizing the functioning of the device. About said layer 9 a layer 11 is detachably provided which consists of a non-magnetizable material and constitutes the shell surface of the printing roller. In the drawing, this layer is shown in the form of a sleeve 11 of a relatively hard wood species, which with a close can be pushed onto the layer 9 and in its intended position thereon can be locked to prevent movement relative to the layer 9. In the embodiment shown, the layer or sleeve 11 is provided with a large number of radially drilled through holes 12 arranged in groups of six holes each according to the Braille cell-system for composing the text to be printed by means of pins of magnetizable material, for example steel, which upon contact with the layer 9 of the magnetized electromagnet are attracted thereto and remain in their holes until the current supply to the electromagnet is interrupted, i.e. until the electromagnet is demagnetized. These pins, one of which is shown disposed in a hole in FIG. 2 and is designated by reference character has 13, such a diameter as to fit without appreciable play in the holes 12, and a length, which slightly exceeds the thickness of the layer 11, so that the pins inserted in the holes project with one rounded end slightly above the shell surface of the layer 11 to bring about depressions in that side of the paper which is pressed against the shell surface of the printing roller, and thereby to bring about raised dots readable by being touched on the other side of the paper, without causing the paper to burst.

The illustrated embodiment of the the invention for printing Braille is adapted with respect to dimensions to the paper size A4 (i.e., 210 mm. × 297 mm.), but of course can be dimensioned to suit all other occurring paper sizes. The embodiment is provided in its outer layer 11 with 29 rows of 30 hole groups each, i.e. a total of 5220 holes 12. Each such hole group comprises, as already mentioned, the six holes of the Braille system constituting a so-called Braille-cell, where the mutual distance between the holes horizontally and vertically is equal and in the embodiment adapted to the A4-size amounts to 2.5 mm. This distance, of course, can be increased as well as decreased without abandoning the idea of the invention. As an example, it can be mentioned that in the illustrated embodiment the distance from, the left-hand edge of the printing roller to the first hole in a row is 14mm, that the distance between two hole groups is 3.75 mm, and that the distance between two rows is 5.5 mm. These measurements, of course, apply only to the embodiment illustrated by way of example and can be changed from one case to another as required and according to the size of the paper to be provided with Braille and to the size of the script. Mention should be made, further, that said gap 10 in the layer 9 is located between two hole groups.

The composing of the Braille to be printed is carried out either manually or mechanically. Pins are inserted into the different holes in agreement with the Braille alphabet after the electromagnet has been magnetized, so that the inserted pins are retained in their respective holes. The composing can take place directly in the printing unit, in which the printing roller according to the invention is disposed and which also carries a counter-pressure roller, which is not shown in the drawings, and may be provided with a shell surface of rubber or another elastic material or of a harder material such as, for example, steel. In this latter case, however, the shell surface of the counter-pressure roller must be provided with small cavities arranged in the same manner as the holes in the printing roller. When paper of A4 size is advanced between the two rotating rollers, the pins bring about corresponding raisings in the paper and, as a result thereof, the Braille composed by means of the pins is printed on the paper between the rollers. By exchanging said counterpressure roller against a printing roller according to the invention, where the holes are slightly offset, for example half the distance between the holes in a group, both upward and in lateral direction, it is possible to provide both sides of a paper sheet with Braille in a single printing operation. By arranging several printing rollers to the side of each other, thus, different sides can be printed simultaneously.

The present invention is not restricted to what is described above and illustrated in the drawings, but it can be altered and modified in many different ways within the scope of the inventive idea as it is defined in the attached claims. The device for printing Braille according to the invention, thus, must not necessarily be designed as a roller, but may also have the form of a printing stamp or the like having a plane surface with the holes arranged therein. It further is possible, instead of a counter-pressure roller to cause the printing roller according to the invention to roll over a plane dolly with an elastic surface or with a hard surface provided with cavities arranged in agreement with the holes of the roller. Also other combinations can be imagined within the scope of the invention.

What I claim is:

1. A device for printing Braille, said device comprising a magnetizable core, an outer layer on said core provided with holes arranged in a pattern for composing a text to be printed, pins of a magnetizable material, an inner layer of magnetizable material inside said outer layer and covering the holes therein, said pins being of greater length than the thickness of said outer layer and being adapted upon contact with the magnetizable material to be attracted thereto and thereby to remain in their respective holes, said magnetizable core and inner and outer layers forming a roller, said outer layer being constituted as a sleeve fitted on said inner layer for common rotation therewith, said holes in the outer layer extending radially in said sleeve, said core including two end portions between which is a depression, an electrical winding in said depression to magnetize said core, the outer layer being of a non-magnetizable material having ends affixed to said core, the magnetizable core being an electromagnet, said core, inner layer and outer layer being substantially coextensive in length, an axle coaxially mounted in and rotatably supporting said core, and a slip ring on said axle and coupled electrically to said winding.

2. A device according to claim 1, wherein said layer of magnetizable material is provided with a gap.

* * * * *